US010040935B2

(12) United States Patent
Boutrid et al.

(10) Patent No.: US 10,040,935 B2
(45) Date of Patent: Aug. 7, 2018

(54) MULTILAYERED FILM MATERIAL FORMABLE INTO LIGHTWEIGHT PACKAGING (71) Applicant: BUERGOFOL GmbH, Siegenburg (DE)

(72) Inventors: Abdel-Kader Boutrid, Siegenburg (DE); Kurt Stark, Neuhaus a.d. Pegnitz (DE); Franz Schleicher, Ingolstadt (DE); Gregor Schleicher, Ingolstadt (DE)

(73) Assignee: BUERGOFOL GMBH, Siegenburg (DE)

( * ) Notice: Subject to any disclaimer, the term of this patent is extended or adjusted under 35 U.S.C. 154(b) by 0 days.

(21) Appl. No.: 15/679,253

(22) Filed: Aug. 17, 2017

(65) Prior Publication Data

US 2018/0016434 A1 Jan. 18, 2018

Related U.S. Application Data (62) Division of application No. 14/061,838, filed on Oct. 24, 2013, now abandoned.

(51) Int. Cl.
*C08G 79/08* (2006.01)
*C08L 67/03* (2006.01)
*C08J 5/18* (2006.01)
*B32B 27/36* (2006.01)
*B32B 27/32* (2006.01)

(52) U.S. Cl.
CPC ............. *C08L 67/03* (2013.01); *B32B 27/32* (2013.01); *B32B 27/36* (2013.01); *C08J 5/18* (2013.01); *C08J 2367/02* (2013.01); *C08J 2423/00* (2013.01)

(58) Field of Classification Search
USPC ....................................... 428/35.7
See application file for complete search history.

(56) References Cited

U.S. PATENT DOCUMENTS

| | | | |
|---|---|---|---|
| 3,944,699 A | 3/1976 | Mathews et al. | |
| 4,368,295 A | 1/1983 | Newton et al. | |
| 5,885,481 A | 3/1999 | Venkateshwaran et al. | |
| 6,224,973 B1 | 5/2001 | Trouilhet | |
| 6,916,548 B2 | 7/2005 | Murschall et al. | |
| 8,361,580 B2 | 1/2013 | Stark et al. | |
| 2003/0059591 A1 | 3/2003 | Penttinen et al. | |
| 2004/0146669 A1 | 7/2004 | Gollier et al. | |
| 2005/0287345 A1 | 12/2005 | Tyler et al. | |
| 2006/0257652 A1 | 11/2006 | Su | |
| 2006/0286323 A1 | 12/2006 | Siegel et al. | |
| 2008/0063845 A1 | 3/2008 | Musacchio | |
| 2009/0263645 A1 | 10/2009 | Barger et al. | |
| 2010/0291396 A1 | 11/2010 | Peiffer et al. | |
| 2011/0052867 A1 | 3/2011 | Yamamura et al. | |
| 2011/0086141 A1 | 4/2011 | Strilich et al. | |
| 2012/0225273 A1 | 9/2012 | Nomura et al. | |
| 2012/0308751 A1 | 12/2012 | Neill et al. | |
| 2013/0183465 A1 | 7/2013 | Liang et al. | |

FOREIGN PATENT DOCUMENTS

| | | |
|---|---|---|
| DE | 10026177 | 11/2001 |
| DE | 102009041841 | 7/2010 |
| DE | 10029021714 | 11/2010 |
| DE | 102009021714 | 11/2010 |
| DE | 112010004485 | 5/2011 |
| EP | 0044616 | 1/1982 |
| GB | 2172601 | 9/1986 |
| WO | WO 2009/084518 | 7/2009 |

OTHER PUBLICATIONS

EP Office Action, dated Sep. 9, 2016.
EP Search Report, dated Apr. 9, 2014.
German Patent Office Search Report, dated May 31, 2013.

*Primary Examiner* — Terressa Boykin
(74) *Attorney, Agent, or Firm* — Dority & Manning, P.A.

(57) ABSTRACT

A single or multilayered film is presented having at least one layer that contains at least one thermoplastic olefin homo or copolymer, modified if need be. The layer contains additionally, at least one polyester. Such film is used as a sliding film or preliner in trenchless pipe renovation using the tube lining technique in which the film is layed on the inner wall of an underground sewer pipe laid that will be renovated. An insertion pipe with a curable carrier material can be pulled in sliding fashion over the sliding film laid on the pipe.

20 Claims, 4 Drawing Sheets

MULTILAYERED FILM MATERIAL FORMABLE INTO LIGHTWEIGHT PACKAGING

CROSS-REFERENCE TO RELATED APPLICATIONS

The present application is a divisional of application Ser. No. 14/061,838 filed Oct. 24, 2013, which is hereby incorporated herein by this reference for all purposes.

FIELD OF THE INVENTION

The invention refers to a method for trenchless renovation of a sewer pipe using a single layer film or a multilayered film.

BACKGROUND

A film that includes at least one coating that contains a modified thermoplastic olefin homo-polymer or copolymer has been known for a long time. Products made of polyethylene (PE), for example, and especially those made of low density polyethylene (LDPE), are trash bags, shrink films and agricultural films. In addition, numerous multilayered films are known that have three, five or seven layers, for example, from which one or several contain PE or PP (polypropylene).

It can be generally said that the application area of films containing olefin homo or copolymers is very large. One of the fields of use is also the pipe lining process for trenchless pipe sewer renovation, in which—in the case of a glass fiber-pipe liner system with UV or steam curing—it is known for installation purposes that a thick-walled PE film with a high density (HDPE or high density polyethylene) is applied to the inner wall of the pipe to be renovated (a sliding film), mostly in semicircular cross-section form. Subsequently, a flexible insertion tube (also known as tube liner or merely liner) is inserted into the pipe to be renovated (insertion process) and the insertion tube slides over the sliding film. On the one hand, this prevents the insertion tube from being damaged by the inner wall of the pipe or objects inside it and, on the other hand, this greatly reduces friction between the insertion tube and sliding film, thus facilitating the retraction of the insertion tube—a functioning similar to that of a shoehorn. In the glass fiber-tube liner system cured with UV or steam, such an insertion tube (tube liner) typically has an inner and outer tube with a carrier material (such as glass fibers) inserted between them that has been impregnated with reactive plastic resin. Some of the reactive plastic resins used are, for example, commercially available UP resins (polyester/unsaturated polyester resins), VE resins (vinyl ester resins) or EP resins (epoxy resins). For example, UP or VE resins are hardened with the help of photoinitiators, but heat can also harden them. The insertion tube is inflated inside the pipe until it presses tightly against the inner wall of the pipe or the sliding film in order to subsequently harden the resin—with ultraviolet light from a UV light source being pulled slowly through the pipe, for example. At the end, the inner film of the insertion tube is peeled off and removed. The layer with the carrier material is then exposed to the substances guided through the pipe.

Instead of the sliding film described above, a preliner (also known as preliner film) is often inserted into the pipe to be renovated—in particular in the case of the synthetic fiber-tube liner system with warm water or steam curing. A preliner, typically made of high density polyethylene (HDPE), is a thick-walled film that lines the pipe completely and also prevents direct contact of the tube liner with the inner wall of the pipe. To accomplish this, the preliner is directly laid on the inner wall of the pipe. Afterwards, the tube liner is inserted into the pipe (insertion process) or inverted (inversion process). The preliner prevents, for example, the tube liner's plastic resin from adhering to the pipe wall and the still unhardened resin from making contact with dirt and water. Furthermore, the preliner film also prevents the resin from seeping out of the sewer pipe renovation system and contaminating the soil and ground water. The preliner film also protects the feeds from penetrating excess resin so no resin plugs and obstructions can form. Additionally, during the insertion process, a preliner takes over a function that reduces the sliding friction, similar to the one described for the sliding films described above, for the tube liner that will be inserted. In this case, the low coefficient of friction between the sliding film or preliner and the outer film of the tube liner is what matters. As a result of this, the insertion tube or tube liner is not damaged by the pipe's inner wall or objects inside the pipe when it is inserted into the pipe and, on the other hand, the friction between tube liner and sliding film or the preliner is very low, thus facilitating retraction of the tube liner. Therefore, the preliner can also be called a sliding tube.

The disadvantage of the HDPE film used as a sliding film or preliner mentioned above is, among other things, its required thickness of approx. 500 µm to 800 µm or more, which translates into a large quantity to maintain more or less its mechanical stability and strength. Otherwise, the sliding film or preliner would develop cracks owing to the mechanical stresses inside the pipe caused especially by sharp or rough uneven surface irregularities and would no longer be able to fulfill its purpose.

In addition, the known HDPE film has a very large elongation capability that can even reach 200%. As a result of this, an "accordion effect" can occur when the tensile force is removed (i.e. the film contracts when this occurs). When, during the relative movement of the insertion tube with respect to the sliding film or preliner, the latter is stretched and finally the tensile force exerted by the insertion tube subsides, the sliding film or preliner can contract once again, in which case there is a risk that the sliding film or preliner and the insertion tube will create an obstruction in the sewer pipe to be renovated.

On the other hand, HDPE reaches maximum strength during sudden dynamic elongation. With further pulling (for example, with an even more forceful jerk), the film will start yielding irreversibly until it tears. Therefore, there is the danger of an uncontrollable retraction of the insertion tube, which therefore can get stuck in the pipe and may not be easily removed or properly inserted any longer.

Furthermore, the materials currently used in the PE films in the state of the art, especially HDPE films, are inadequate with respect to their mechanical properties such as (additional) tear strength, tensile strength, impact strength or puncture resistance. Finally, the PE films used as preliner film in the state of the art have no barrier effect either against resin components such as styrene, for example.

SUMMARY OF THE INVENTION

It is a task of this invention to provide a method for trenchless renovation of a sewer pipe using a single layer film or a multilayered film that meets high stability requirements while having relatively low thickness. Additional objects and advantages of the invention will be set forth in part in the following description, or may be obvious from the description, or may be learned through practice of the invention.

The advantages of the invention can be especially seen in that films employed according to the invention boast good mechanical properties such as sturdiness, resistance, puncture resistance, good inherent stability, low elongation capability and good sliding properties.

It was surprising to determine that it is possible to homogenize and make compatible two completely different, naturally incompatible polymers such as A-PET and PE during extrusion, for example. Surprisingly, the outstanding mechanical values, in particular, were achieved with the film according to the invention. Owing to these properties, the films according to the invention are ideally suitable for use as a sliding film or preliner in trenchless sewer pipe renovation.

If the film is used, for example, as a sliding film or preliner (sliding tube), then it is first of all highly resistant and secondly the insertion tube can be pulled through the pipe with only little friction. In this case, the coefficient of friction (COF) against another film having a PE outer coating is between 0.05 and 0.5, preferably between 0.1 and 0.3. It has also been shown that the tear and additional tear resistance of films according to the invention are very high—in other words, the films can virtually not be torn and when they have been ripped, then the force used for ripping them further is very high. Additionally, they stretch very little or negligibly so in the machine direction (md), i.e. in the moving direction during film manufacturing. In other words, a very strong force in the machine direction is necessary to achieve some stretching at all and this prevents the "accordion effect" mentioned above.

In an advantageous embodiment when used as a sliding film or preliner, it is convenient for the film not to have any sharp corners and edges so the insertion tube is not damaged. It is preferable to cut with sharp knives without fraying the film according to the invention. It is preferable to heat up the knife's cutting surface or cutting wire used to a high temperature because this will allow smoothing out and blunting the sharp corners and edges of the polymers in these spots.

Furthermore, the film according to the invention can be advantageously used as packaging material for food products or in the so-called non-food sector, especially as deep-drawing film for bowls, cups, plates, troughs and trays. The food to be packaged can be, for example, fresh food or frozen products such as fresh meat, cooked, cured and processed meat, poultry, fruit and vegetables, fish and shellfish, bread, cakes & pastries, prepared foods, snacks, sweets and confectionary. In the non-food sector, animal feed, medical articles, as well as consumer and industrial goods can be packaged with the film according to the invention. Electronics, household & cleaning products, office supplies, craft accessories as well as industrial components and spare parts, for example, can also be packaged. The film according to the invention can also be used for external paneling, external coverings of building parts, and protective suits, signs as well as for any kind of scoreboard, display or as insulating material.

It must be mentioned that within the meaning of this invention, olefin homo- or copolymers are thermoplastic polymers of α, β-unsaturated olefins with two to six carbon atoms, for example, such as polyethylene (PE, especially LDPE or HDPE), polypropylene (PP), polybutylene (PB), polyisobutylene (PI) or mixtures of at least two of the polymers mentioned above. Low density polyethylene is abbreviated "LDPE" because it has a density within the range of 0.86 and 0.93 g/cm$^3$ and its molecules are characterized by a high degree of branching. "HDPE" indicates a high density polyethylene whose molecular chain is characterized by little branching and its density can lie within the range of 0.94 and 0.97 g/cm$^3$.

A preferred embodiment contains at least one coating with more than 50% by weight of thermoplastic olefin homo- or copolymer and 0.1 to 50% by weight of polyester. An alternative, especially preferred embodiment of the invention has at least one coating with more than 50% by weight of polyester and 0.1 to 50% by weight of thermoplastic olefin homo or copolymer.

Advantageously, an embodiment contains at least one coating between 10% by weight and 35% by weight of thermoplastic olefin homo- or copolymer.

In an embodiment, polyester in amorphous form in at least one coating has proven especially suitable. Specifically, amorphous polyethylene terephthalate (A-PET) has been particularly useful.

Commercially available A-PET is preferably used as material, and can also be regenerated or recycled. Likewise, chaff made up of edge trims, etc. can be used.

Commercially available A-PET is easily obtainable under the name Wellman PermaClear® made by the American firm DAK Americas, Novapet® made by Novapet S.A. of Spain, or Texpet R made by Texplast GmbH of Wolfen [Germany] or SABIC® PET.

In an advantageous embodiment, the coating contains at least one polyester, especially in form of A-PET, in more than 25% by weight, preferably in more than 40% by weight and especially preferable in more than 50% by weight, particularly in more than 65% by weight.

The addition of polyolefin parts in the form of thermoplastic olefin homo- and/or copolymer to A-PET or their presence leads to a considerable improvement of toughness, tensile strength, and additional tear resistance.

It has also been determined as advantageous for the olefin homo- or copolymer in the coating to have a glass transition temperature Tg in the range from −90° C. to +110° C., especially from −80° C. to +40° C. This reduces the excessively high stiffness of the polyester, particularly of A-PET, and lowers the elastic modulus of the film.

The olefin homo- or copolymer is preferably polyethylene (PE), used preferably in the form of high density polyethylene (HDPE). Additionally, LDPE and/or LLDPE (linear low density polyethylene) can be advantageously used, as well as polyolefins, especially polyethylene polymerized on the basis of metallocen catalysts (mPE), such as mLDPE (metallocen LDPE) and mLLDPE (metallocen LLDPE). Polyethylene is classified in different categories, mainly with regard to its density and branching. Its mechanical properties depend greatly on variables like length and type of branching, crystalline structure and molecular weight. The most frequently sold polyethylenes are HDPE, LLDPE and LDPE.

Specifically, the polymer order looks like this:
Ultra high molecular weight polyethylene (UHMWPE)
Ultra low molecular weight polyethylene (ULMWPE or PE-WAX)
High molecular weight polyethylene (HMWPE)
High density polyethylene (HDPE)
High density cross-linked polyethylene (HDXLPE)
Cross-linked polyethylene (PEX or XLPE)
Medium density polyethylene (MDPE)
Linear low density polyethylene (LLDPE)
Low density polyethylene (LDPE)

Very low density polyethylene (VLDPE)

Chlorinated polyethylene (CPE)

VLDPE (very low density polyethylene) is defined by its density range of 0.880 to 0.915 g/cm$^3$. It is essentially a linear polymer with a high proportion of short side chains, typically manufactured by linear copolymerization of ethylene with short-chained alpha olefins (e.g. 1-butene, 1-hexene, and 1-octene). VLDPE is very frequently manufactured using metallocen catalysts because they allow more the insertion of more co-monomers.

In accordance with another advantageous alternative, polypropylene (PP) is used as the olefin homo- or copolymer.

Mixtures of different olefin homo- or copolymers, including those listed above, in the (at least one) coating according to the present invention are readily possible.

The HDPE material used as in the mixture of the coating according to the invention may be Hostalen® made by LyondellBasell Industries, for example.

The at least one olefin homo- or copolymer in the at least one coating mentioned above can be formed as an adhesion promoter or be provided or modified with adhesion-promoting functional groups. Such an adhesion promoter or olefin homo- or copolymer with an adhesion-promoting function contains the corresponding functional groups such as epoxy groups, peroxide groups, ketone groups, aldehyde groups, (carboxylic) acid groups, amine or amide groups, acid anhydride groups and/or hydroxyl groups, for example. Such functionalization can improve the compatibility of the polyester and polyolefin polymers deemed to be essentially incompatible.

Particularly advantageous is modification with at least one organic acid or at least one organic acid anhydride, preferably with a cyclic organic acid anhydride. Especially advantageous is the modification with maleic acid anhydride groups because these groups act like adhesion promoters between the at least one polyester and the at least one olefin homo- or copolymer.

It is likewise possible for the at least one coating mentioned above to contain unmodified polyolefin in addition to modified polyolefin.

It must be stressed that, surprisingly, an extrusion of polyester and polyolefin for manufacturing the film according to the invention was possible even without making it compatible. We succeeded to homogenize well the chemically different materials with the help of a conventional extruder. In other words, the mixture can be extruded even without functionalization.

However, according to the variant described above, the functionalized polymers mentioned above can be used as compatibilizers or conventional adhesion promoters too. In a preferred embodiment, they are added in small quantities of 0.1 to 10% by weight to the olefin homo- or copolymer in the at least one coating mentioned above.

Although not necessarily required, the different components A-PET and polyolefin can be mixed in advance through compounding to improve the homogeneity of the mixture even more.

The film according to the invention has preferably a thickness of 20 to 2000 µm, better from 50 to 1500 µm, even better from 100 to 1000 µm, and ideal from 200 to 900 µm. For use as a sliding film or preliner, the latter coating thickness range has proven to be the especially useful.

It must be stressed, however, that the term "film" should not imply maximum thickness.

In accordance with an advantageous embodiment, the film according to the invention has at least one discrete barrier coating. Such barrier coating is based preferably on ethylene vinyl alcohol (EVOH) or polyamide (PA) or both. The barrier coating is advantageous as an obstacle for monomers such as styrene and/or oils and fats. The chemical compound that performs the barrier function (e.g. PA) can be present up to 100% in the barrier coating.

Alternately or additionally, the film according to the invention can have an independent coating that contains at least one chemical compound acting as a barrier against chemical substance penetration, preferably against monomers such as styrene and/or at least one that acts as a barrier against UV and (advantageously) visible light. The use of polyamide as a chemical compound for the barrier effect has been advantageous. To achieve a UV light barrier, the most varied compounds—by themselves or in combination—can be used to absorb and/or reflect UV radiation and, advantageously, visible radiation too (at least a part of the visible spectrum, advantageously short-wavelength visible light). Preferably, UV radiation in the wavelength range of 200 to 400 nm and visible light radiation in the wavelength range of 400 to 800 nm is absorbed and/or reflected, preferably more than 90%. In particular, a transmission in the wavelength range from 300 to 500 nm, especially from 350 to 450 nm, is preferably totally or largely prevented. To achieve this, organic and/or inorganic color pigments, dyes or compounds can be used, all known to the specialist (see, for example, DE 10 2009 041 841 A1).

In an advantageous embodiment, the film according to the invention contains at least one independent coating with at least one chemical compound acting as a mechanical barrier and at least one chemical compound to achieve a UV barrier and a barrier against ranges of visible light.

Depending on the application, one or several of the following polymers and substances can be added to the polyester, preferably present in form of A-PET, or to the coating that contains the polyester. These additives, which can be added up to a maximum of 15% by weight, are: polystyrene (PS); poly-halogenides such as PVC and/or polyvinylidene chloride (PVdC), for example; polyamide (PA); polyvinyl alcohol (PVOH or PVAL); ethylene vinyl alcohol copolymer (EVOH); adhesion promoters; ethylene vinyl acetate (EVAc); one or several ionomers; one or several poly(meth)acrylates; ethylene-containing poly (meth)acrylates; polyvinyl acetate (PVAc); polycarbonate (PC); polyacrylnitrile (PAN); additional polyesters such as polybutylene terephthalate (PBT), polyethylene naphthalate (PEN), polylactic acid (PLA) and/or polyhydroxyalkanoates (PHA); one or several ethylene acrylic acid copolymers (EAA); polyvinyl butyral (PVB); polyvinylacetal; cellulose acetate (CA); cellulose acetobutyrate (CAB); polysaccharides; starch; cyclic olefin co-polymer (COC).

To improve the film's properties, the following components or additives can be added during extrusion in one or several coatings, up to a maximum of 15% by weight. Some of the additives that can be used are, for example: optical brighteners, thermal stabilizers, antioxidants, oxygen scavengers, slip agents, spacers (e.g. silica particles, SAS), slipping/antiblocking agents, colors, pigments, foaming agents, antistatic agents, process aids, lubricating agents, flame retardants, flame inhibitors, impact modifiers, impact resistance improvers, anti-hydrolysis agents, UV absorbers, UV protection agents, stabilizers, antifogging additives, waxes, wax additives, release agents, sealing or peeling additives, nucleating agents, compatibilizers, flow agents, flow improvers, melt strength enhancers, molecular weight increasers, cross-linkers or softeners.

The film according to the invention can have a mono- or multi-layer structure. In the latter, intermediate and/or covering coatings (outer coating) can be provided—in addition to the film—with at least one coating having a thermoplastic olefin homo- or copolymer, and at least one polyester. When the film according to the invention has its own covering or external coating (i.e. not identical to the film) on one or both sides, then such an external coating can be, for example, a pure A-PET external coating, generally a polyester coating, or a pure HDPE external coating, generally a polyolefin coating. In addition, both external coatings can be executed as polyester coatings. Likewise, polyester-polyolefin mixtures are also possible in one or both external coatings. Needless to say, it is also possible to provide a pure polyester coating on one external side and a pure polyolefin coating on the other external side, while the mixture film according to the invention (which contains at least one thermoplastic olefin homo- or copolymer and at least one polyester) is arranged between these external coatings. One or several intermediate coatings (films) are in any case possible.

The films according to the invention can be manufactured in various ways. A preferred manufacturing method uses extrusion or coextrusion, for example through bubble extrusion or cast extrusion. Here, a possible extrusion process is chill roll. Furthermore, both individual and all coatings of the film according to the invention can be formed by extrusion, particularly through bubble film extrusion and/or flat film extrusion, especially bubble film co-extrusion and/or flat film coextrusion. The flat film coextrusion process has proven to be very suitable in this case.

An extrusion coating is also possible, as is a smoothing process. In addition, lamination techniques can also be used.

The film according to the invention can be laminated with additional films in order to obtain a film combination, in which for example thermal lamination, extrusive lamination or adhesive lamination is used. According to a corresponding advantageous embodiment, lamination with one film that corresponds to the material of the external film described above for the insertion tube is recommended. Here, an advantageous basis of the lamination film is a polyolefin, in which case a PE basis for the lamination film is preferred.

In case the film according to the invention is executed as a sliding film or preliner, a PE basis for the lamination film is preferred in an embodiment because, during the course of exothermic curing of the reactive resins acting as carrier material in the insertion tube through temperature increase owing to initiation with UV light (or hot water or steam as alternate sources for resin curing, for example), a joining of the sliding film or preliner—containing at least one thermoplastic olefin homo- or copolymer—can also be done on the (cured) insertion tube. As a result of this, the stability of the insertion tube—especially after its curing—can be greatly strengthened once again, which contributes to the improvement of the strength of the sewer renovated with tube liners.

Alternately or additionally, a film combination (is contemplated) that comprises a film according to the invention and at least one additional (preferably laminated) film, for example a light protection film as such additional film. This light protection film is preferably one that absorbs and/or reflects UV light and advantageously visible light as well (at least a part of the visible spectrum, preferably short-wave visible light). In this case, UV radiation is preferably absorbed and/or reflected in the wavelength range from 200 to 400 nm and the visible light rays in the wavelength range from 400 to 800 nm at least partially, preferably by more than 90% and very preferably by more than 99%. In particular, the film according to the invention prevents transmission largely to almost fully in the wavelength range from 300 to 500 nm, preferably from 350 to 450 nm. To achieve this, organic and/or inorganic color pigments, dyes and compounds can be used that are known to the specialist (see above: DE 10 2009 041 841 A1). Thus, the UV- and, if need be, light protective film can be totally opaque or clear or at least contact transparent.

In a film according to the invention used as a sliding film or preliner, such a UV and, if need be, light protective film is preferably laminated on the film's external side facing the resin-impregnated carrier material and advantageously borders the external film of the insertion tube.

According to a highly preferred embodiment, such a laminated UV—and, if need be, light protection—film, can contain chemical compounds with a barrier function with respect to monomers, resins, oils, fats, gases, etc. in particular. Regarding this, reference is made to the descriptions given above for integrating the barrier layer in the film according to the invention. The corresponding chemical compounds acting as a barrier can be contained in the laminated film. A film with such a barrier layer can also be laminated—alternately or additionally—to the UV and, if need be, light protective film—on a film according to the invention.

Alternately to the use of the film according to the invention as a sliding film (roughly semicircular in cross section) or preliner (sliding tube) in trenchless sewer pipe renovation for use with a conventional tube liner, the film combination mentioned above from the film can be used as a preliner (sliding tube) and advantageously laminated UV and, if need be, light protection film—if possible with at least one chemical compound acting as a barrier (e.g. EVOH, PA, see above)—as an outer tube (also known as external tube) for a tube liner system. In this case, the tube liner that is generally used, which consists at least of inner film (internal film), resin-impregnated carrier system, and outer film (external film) is modified by joining the external film (UV and, if need be, light protection film) in a laminar way with the preliner (sliding tube). Thus, the "slimmed down" tube liner no longer comprises the external tube or external film, but merely just the resin-impregnated carrier system and the inner tube film (as well as, if need be, additional films or layers).

The integrated anti-slip film or combination film of sliding film and UV light protection film (including barrier) may only represent partially the external system of a tube liner in an especially preferred embodiment. Thus, for example, a sliding film is laminated with a UV and light protection film (which has a barrier against monomers such as styrene), in which case this combination film only forms the lower section of the external film of the tube liner (e.g. a lower half-shell). The upper part of the external system, which constitutes a flexible UV and light protection film with styrene barrier (without being laminated with the sliding film) is then joined to the lower anti-slip film or the lower external film—through sealing, for example—to become one single tube. Here, the longitudinal edges of the non-laminated part of the external film (i.e. roughly the upper part of the external system) are preferably sealed with the longitudinal edges of the open sliding film or the section of the external film laminated on the sliding film, in other words, the lower part of the external system. The upper and lower part of the external film has preferably the same layer structure and the same layer compositions, although their layer and overall strengths may also vary.

Thus, figuratively speaking, there is a more rigid and mechanically very stable and sturdy lower half-shell joined to a flexible, malleable upper half-shell through sealing. The tube-shaped external film system of the liner obtained in this way thus protects the resin in the interior against UV and light rays as well as from drying out because a comprehensive barrier against monomers such as styrene is achieved. Such a liner-external film system is very advantageous, as the considerably more stable lower section protects the liner from damage when it is inserted into the sewer pipe to be renovated, and the tube liner is executed in a much more malleable way by the more flexible upper part, which supports the positioning of the liner in the sewer pipe.

According to an alternative, a largely semicircular sliding film in cross section is laminated with a tube-shaped UV and light protection film, which in turn boasts a barrier against monomers such as styrene. Thus, the lower part of this combination film constitutes, for example, a lower half-shell, while the upper part is formed by the other, non-laminated, half of the tube-shaped UV and light protection film. Here, then, we have the tube-like execution of a UV and light protection film and not as two parts—as seen in cross section —, so that one can do without the sealing described above.

In accordance with another further development of the invention, the entire tube liner (inner tube, resin-impregnated carrier material, external tube) is joined to a preliner (sliding tube) comprising the layer according to the invention, so that this joining is inserted as a whole into the pipe to be renovated.

The preliner (sliding tube) can furthermore be laminated in the form of a flat film with an UV and light protection film that is preferably also a barrier against monomers and oils such as styrene or gases and is present likewise in the form of a flat film, in order to be subsequently sealed or welded to a tube.

The film according to the invention can also be subsequently stretched or embossed. Printing is possible too.

The structuring of the film surface can additionally de done through pouring on a correspondingly structured roller.

Preferably, the film surface is roughened by adding separators (antiblocking agents) by preparing a batch with coarser particles having a diameter of 0.01 to 10 μm, for example. Silica particles are used in at least one of the outer layers, for example, to prevent the sliding film or preliner from adhering to the insertion tube.

Furthermore, a powder or talc can be still added to the surface(s) of the film. Talcum, for example, is preferred for this.

Regarding the context mentioned above, it should also be ensured that the friction value of the sliding film or preliner according to the invention is preferably small compared to the external film of the insertion tube that is inserted into the sewer pipe for renovation purposes with the help of the sliding film or preliner. According to the embodiment that is advantageous in this respect, a lowering of the coefficient of friction (COF) can be accomplished, for example, with wax additives such as ethylene-bis-stearamide (EBS), erucic acid amide (EAA), etc., and with release agents. These wax additives or release agents are preferably applied on the surface of the sliding film facing the external film of the tube liner.

The film according to the invention can also be foamed or at least contain a foamed coating. Even the coating according to the invention that contains, for example, a mixture of PE and A-PET, can be foamed, something that also constitutes a preferred embodiment.

It is, in addition, advantageously possible for the film according to the invention to be laminated with a non-woven material, textile, needle felting, synthetic fibers or fleece. The lamination, in particular, is done with a material capable of absorbing liquids and resins. Such a lamination of the film according to the invention (that additionally has a UV and light protection film with or without barrier) with a non-woven material is likewise possible. Especially preferred, however, is the film according to the invention laminated against a UV and light protection film that, in turn, has already been laminated with a non-woven material. The lamination with the film according to the invention against the UV and light protection film takes place preferably on the side of the UV and light protection film that has not been laminated with the non-woven material. Thus, the side laminated with a non-woven material (here the UV and light protection film including the barrier) can still be available for bonding with the reactive resin.

Further processing options exist when the film according to the invention is brought together with a "fabric" or mesh (e.g. plastic netting). Alternately, this "fabric" or mesh can be introduced into the film for purposes of additional strengthening.

BRIEF DESCRIPTION OF THE DRAWINGS

Various design examples of the invention are schematically represented in the figures, which show.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
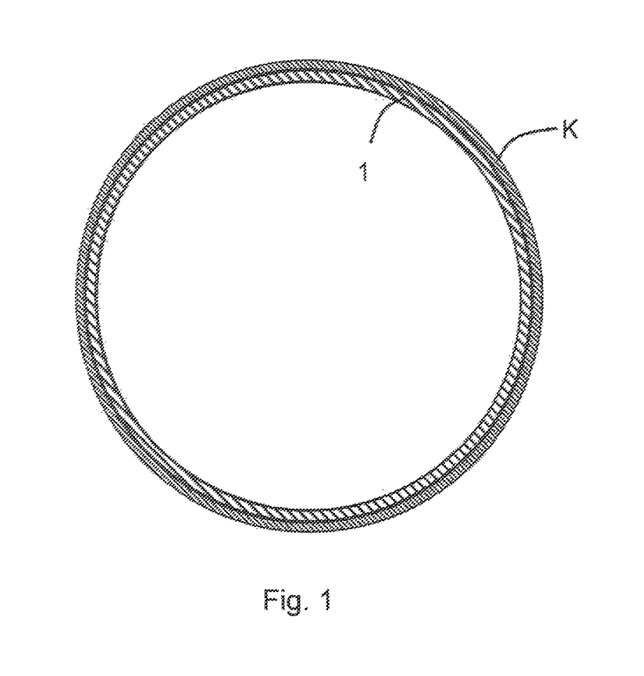
FIG. 1 is a sewer pipe to be renovated with a preliner (sliding tube), in cross section.
Figure 2:
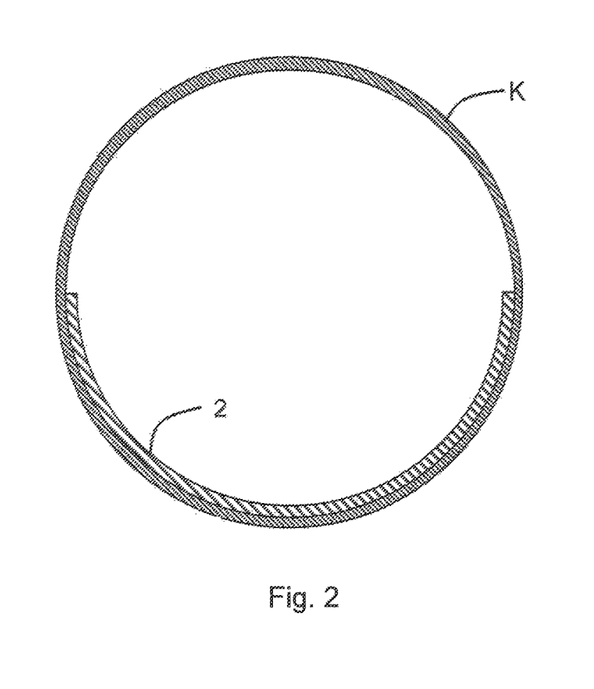
FIG. 2 is a sewer pipe to be renovated with a sliding foil, in cross section.

FIG. 1 shows a sewer pipe K to be renovated in cross section, in which a preliner 1 (sliding tube) is inserted according to the invention. A largely semicircular sliding film 2 in cross section is shown in FIG. 2, where it has been correspondingly applied on the lower semicircular shell of sewer pipe K. The preliner 1 according to FIG. 1 and the sliding film 2 according to FIG. 2 have a coating 3 with the mixture according to the invention of at least one thermoplastic olefin homo or copolymer (modified if need be), and at least one polyester. They are mechanically resistant and also have low friction so a tube liner can be inserted.

Figure 3:
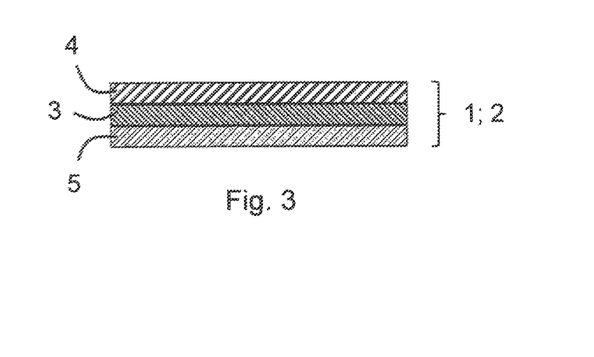
FIG. 3 is a cross section through the preliner or sliding film according to FIG. 1 or FIG. 2.

FIG. 3 shows a possible 3-layered structure of the preliner 1 according to FIG. 1 in cross section or of the sliding film 2 according to FIG. 2. Here, the coating 3 with said mixture is arranged between two external coatings 4, 5 that both contain 100% polyester, e.g. A-PET (see also the corresponding example 1 below). In a variant not shown, at least one independent barrier coating (and, if need be, additional coatings) to resist penetration by gases and/or chemical substances (not shown) can be provided in addition to coating 3, preferably on the basis of ethylene vinyl alcohol (EVOH) or polyamide (PA) or both and more preferably in each case made 100% of these compounds. This or another coating can at least contain a chemical compound acting as barrier against UV light and visible light to at least largely prevent radiation in the 350 to 450 nm wavelength range.

Figure 4:
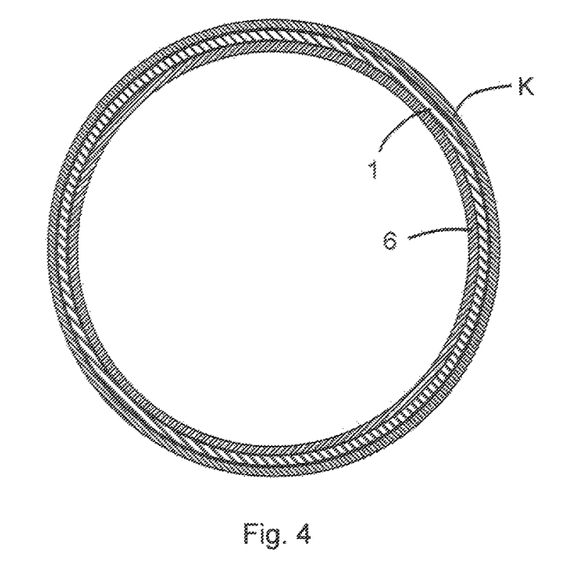
FIG. 4 is a sewer pipe to be renovated with a preliner (sliding tube) with a laminated UV protection film, in cross section.
Figure 5:
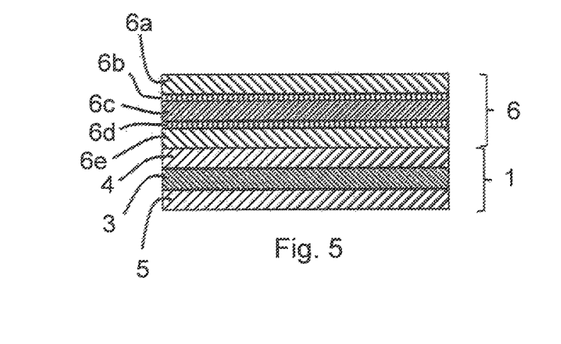
FIG. 5 is a cross section through the preliner and the laminated UV protection film, in cross section.

FIG. 4 shows that a film 6 has been laminated on the preliner 1 according to FIG. 1 or such film was formed through coextrusion. In this case, the additional film 6 has been executed as a UV protection film with barrier function against styrene, for example. As the detailed cross section according to FIG. 5 shows, the film 6 laminated on the preliner 1 has a five layer structure having, for example, the coating succession of polyethylene (6a)/HV (6b)/polyamide (6c)/HV (6d)/polyethylene (6e). Here, this film 6 resembles an external tube film that—unlike the state of the art—is not connected to a tube liner, but to the preliner 1. According to the state of the art, such a tube liner comprises, in its easiest form, typically an internal tube or a tube-shaped internal film, a carrier system with a resin curable with UV and an external tube or a tube-shaped external film. In this case, however, the external tube 6 forms a composite film together with the preliner 1. The tube liner to be used subsequently has therefore, appropriately, no external tube. According to an alternative not shown, another film has been laminated between the preliner 1 and the additional external film (outer film) 6 (or even additional films), for example an own or additional UV protection film. Such a composite can also be manufactured through coextrusion.

Figure 6:
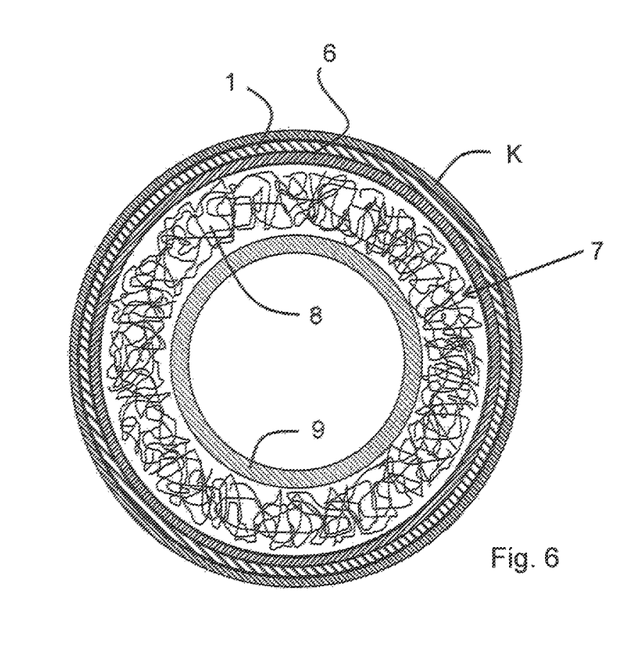
FIG. 6 is a sewer pipe to be renovated with a preliner and a tube liner; in cross section.

FIG. 6 shows a complete system of a sewer pipe K to be renovated, into which a preliner 1 has been inserted. The outer film 6 can either be joined to the preliner 1 (see FIG. 4) or be a part of the tube liner 7 (structured as known), which then has an internal film (inner film) 9, a resin carrier system 8, and an external film (outer film) 6. According to another alternative, the preliner 1 and the entire tube liner 7 can constitute one single composite that is then introduced into the sewer pipe K.

The tube-shaped preliner 1 with a laminated additional film (top: the outer film 6) can be preserved by means of extrusion lamination or also through sealing of the laminated film composite. Such an especially preferred composite structure is manufactured through coextrusion.

Figure 7:
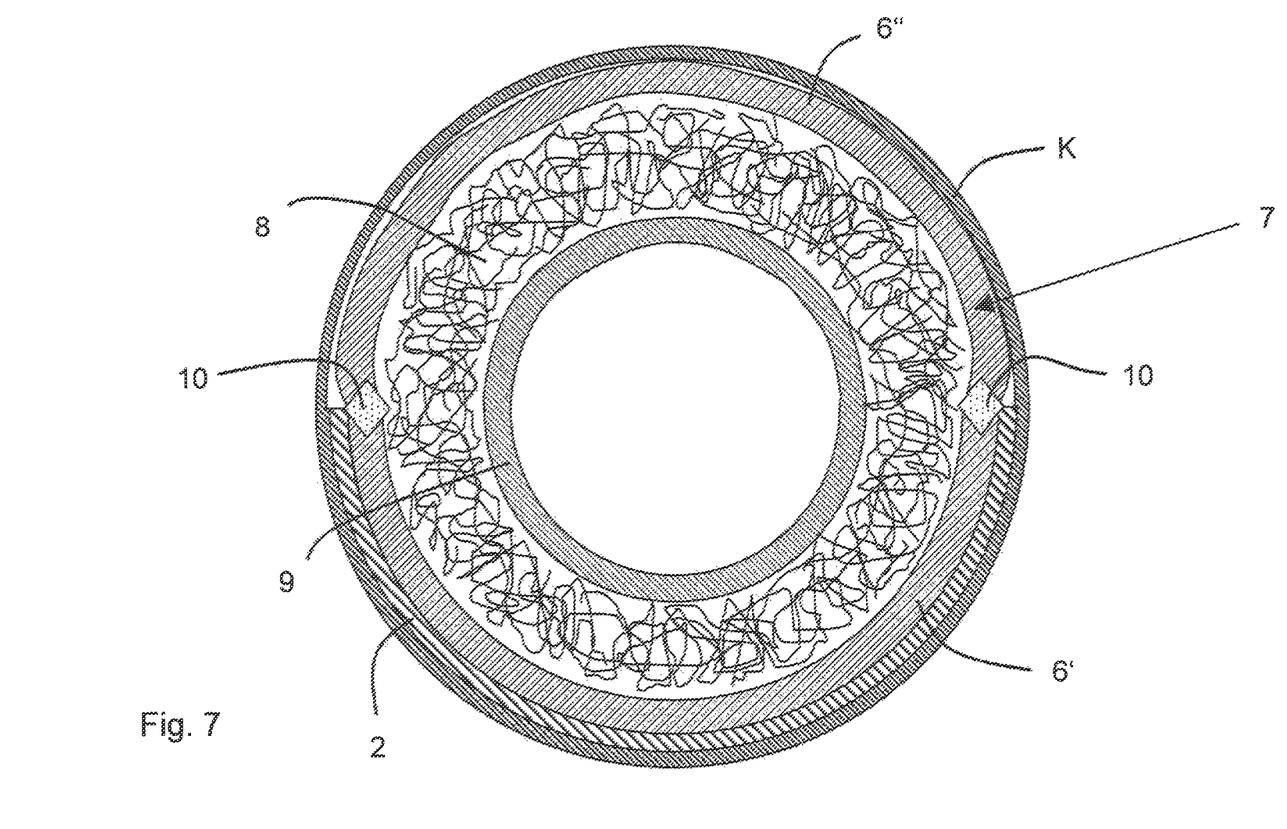
FIG. 7 is a sewer pipe to be renovated with a sliding film and a first, lower external tube laminated on the sliding film as well as a second, upper external tube sealed on this joining, in cross section.

FIG. 7 shows a variant in which a sliding film 2—largely in semicircular shape in cross section in the state installed in the sewer pipe—is laminated with an outer film 6' executed as UV and light protection film, including styrene barrier, which once installed in the sewer pipe, then takes a semicircular shaped state in cross section as well. This outer film 6' constitutes the lower part of the external system of a tube liner 7. The upper part of the external system is formed by an additional outer film 6" likewise executed as flexible UV and light protection film with styrene barrier (without being laminated with the sliding film 2). The two outer films 6' and 6", which preferably have the same coating structure and the same coating composition, are in this case sealed together to form a tube on the sealing spots 10 running in the tube direction (normal to the drawing plane). Alternately, the upper outer 6" film can be sealed with the sliding film 2. Here, the remaining part of the tube liner 7 separate from the two semicircular outer films 6' and 6" is made here, once again, of a resin carrier system 8 and an inner film 9.

Figure 8:
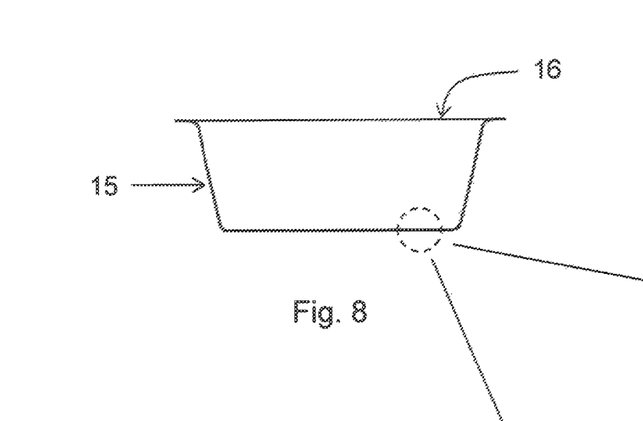
FIGS. 8, 8a, 8b are schematic cross section through a shell, especially for food, as well as two enlarged detailed views of two different film structures.
Figure 8A:
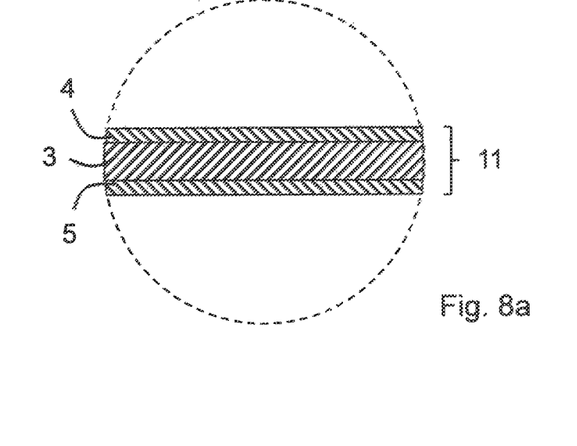
Figure 8B:
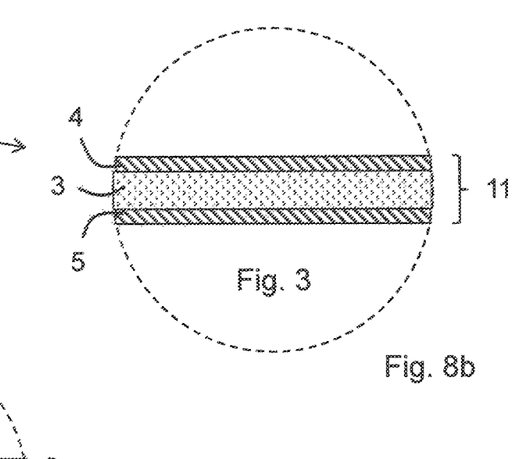

The lamination of the lower external film 6' with the sliding film 2 as well as the sealing of the lower with the upper film 6' and 6" (or of the sliding foil 2 with the upper external foil 6") is done before installation in the sewer pipe FIG. 8 shows a schematic cross section of a well-known form of a preferably deep-drawn shell 15 used for packaging food products (cheese, cold cuts, etc.) and a film structure according to the invention with regard to its bottom that has side walls. The shell 15 or trough can be sealed with an upper film 16, in which case the known systems of permanent seal, easy peel or reclosure can be used. These sealing systems can be installed in the lower film and/or upper film. As can be seen in the enlarged detailed sections according to FIGS. 8a and 8b, the film 11 (lower film), from which the shell 15 consists of, has an inner layer 3, which is executed according to the invention, i.e. containing at least one thermoplastic olefin homo or copolymer, if need be modified, and additionally at least one polyester. The two outer layers 4, 5 consist, for example, of 100% foamed or non-foamed A-PET. Alternately, the two outer layers 4, 5 can be executed differently with regard to their components and processing, thickness, etc. FIG. 8a shows schematically that layer 3—with its mixture of olefin homo or copolymer and polyester—is not foamed, whereas layer 3 is foamed according to FIG. 8b. The films shown in FIG. 8 can additionally be coextruded with one or several additional layers and/or laminated with one or several additional films, for example with those having a barrier function. These are layers or films with EVOH and PA. It is also possible for the film according to the invention (if need be, likewise coextruded with additional layers or additional films) to be executed as the upper film 16 for food product packaging. Also, such films according to the invention can be used both in the lower and upper film. Furthermore, other food containers such as cups or pouches can be executed as described.

EXAMPLES ACCORDING TO THE INVENTION

Example 1

The film according to example 1 had a three-layered A-B-A structure, a make-up of 50:410:50, an overall thickness of 510 μm and a basis weight of 661 g/m² and, with this, a medium density of 1.296 g/cm:

Layer A:
  Mono A-PET with a medium density of 1.34 g/cm³,
  An antiblocking agent with a 1% concentration was added,
  Thickness of layer A: 50 μm,
  Basis weight of layer A: 67 g/m²;

Layer B:
  Mixture of A-PET with LDPE,
  The proportion of A-PET was 78% by weight, the proportion of PE 20% by weight,
  The density of A-PET was 1.34 g/cm³, the density of LDPE 0.92 g/cm³,
  A white pigment (TiO$_2$) with 2% by weight and a density of 1.74 g/cm³ was added as color pigment (in form of a color batch), Thickness of layer B: 410 μm,
Basis weight of layer B: 527 g/m²; medium density was 1.285 g/cm³.
Layer A (Both A Layers were Identical):
Mono A-PET with antiblocking agent,
Thickness of layer A: 50 μm,
Basis weight of layer A: 67 g/m².

Example 2

Many parts of the film according to example 2 resembled those of example 1. The two A layers were identical to those of example 1. Layer B corresponded likewise to layer B in example 1, but with the difference that the proportion of A-PET was 98% by weight and the proportion of LDPE was 2% by weight. No white pigment or other substances were added.

Example 3 (Not Measured)

Many parts of the film according to example 3 resembled those of example 1. The two A layers were identical to those of example 1. Layer B corresponded likewise to layer B in example 1, but with the difference that the proportion of A-PET was 75% by weight, the proportion of PE was 22% by weight and the proportion of white pigment ($TiO_2$) was 3% by weight.

Example 4 (Not Measured)

Many parts of the film according to example 4 resembled those of example 1. The two A layers were identical to those of example 1. Layer B corresponded likewise to layer B in example 1, but with the difference that the proportion of A-PET was 99.5% by weight and the proportion of LDPE was 0.5% by weight. No white pigment or other substances were added.

Example 5 (Not Measured): Combination Film or Integrated Sliding Protective Film The film according to example 4 was laminated with a 230-μm thick PE-HV-PA-HV-PE film (5-layer film). The PE-PA-PE film was fully impermeable to UV radiation and visible light radiation (UV-Vis abbrev. for visible=visible light) transmission in the wavelength range of 200 nm to 800 nm under 0.5%).

Example 6 (Not Measured): External Film System of a Tube Liner

The (laminated) film from example 5 with a width of 500 mm was sealed on both external longitudinal edges with a likewise 500-mm wide, 230-μm thick PE-PA-PE film in such a way that the result was a closed tube (circumference approx. 1000 mm). During sealing, the PE side of the combination film from example 5 was sealed with the PE side of the non-laminated 230-μm thick PE-PA-PE UV and light protection film. The PE-PA-PE-film was completely impenetrable to UV radiation and visible light radiation (UV-Vis transmission in the 200 nm to 800 nm wavelength range under 0.5%).

The antiblocking agents in the examples given above prevent the adhesion of the film according to the invention to another material. Antiblocking agents are, for example, solids that generate micro roughness on the plastic surface and as a result of that create an ultra thin air layer as a separating layer when two films are placed on top of one another or when the films are moved with regard to one other. In the case of a sliding film or preliner, the external layer containing the antiblocking agent faces the insertion tube, in which case the insertion tube, when pulled over the sliding foil or preliner installed in the pipe will not adhere to this external film of the sliding film or preliner.

COMPARATIVE EXAMPLES

Comparative Example V1

Whitish cloudy commercially available HDPE film (mono film), already used as sliding film in the sewer pipe renovation field; manufacturing through cast extrusion; thickness 500 μm. Material: Hostalen® GD 4755, density 0.953 g/cm³.

Comparative Example V2

Whitish cloudy commercially available HDPE film (mono film); manufacturing through "sheet extrusion process", i.e. slotted nozzle with calendar for manufacturing a plate-shaped film (sheet); thickness 600 μm.
Measurement Results:
Tensile tests and additional tear tests were carried out with the example films B1 and B2 as well as with the comparative films V1 and V2.

The samples were manually prepared (samples cut to the testing mass) and stored for 24 hours before testing under normal climate conditions of 23° C. and 50% relative humidity.

The measurement of the tensile properties was done according to Part 3 of German Industrial Standard DIN EN ISO 527. The tensile strength $\sigma_{max}$ of a plastic film is given in N/mm². The elongation at break $\varepsilon_B$ indicates in % to what extent the film can be stretched before it tears.

The testing device for the tensile tests was a universal testing machine Zwick/Roell Z020 in the "Makro 50 mm" mode with a macro displacement transducer for measuring the elastic modulus. The test was performed on strips with a length of 140 mm and a width of 15 mm under a speed of 1 mm/min for the tensile modulus and a testing speed of 500 mm/min for the tensile strength. The preload was 1 N, the maximum load of the load cell was 2500 N.

The measurement of the additional tear resistance was performed according to German Industrial Standard DIN 53363-Trapezium. The force in the tear force $F_{max}$ expressed in N is understood to be the force necessary for tearing a piece of plastic film.

The testing device for measuring the additional tear resistance was the universal testing machine Zwick/Roell Z020 mentioned above, in the "Traverse L 50 mm" mode with a traverse displacement transducer. The test was performed on strips having a length of 120 mm and a width of 50 with a 25-mm notch according to DIN 53363-Trapezium. The testing speed was 300 mm/min and the speed of the tensile modulus 300 mm/min as well. The preload was set at 1 N.

The measurement of penetration resistance was done according to German Industrial Standard DIN EN ISO 6603ff.

The testing device used for measuring penetration resistance was the Instron/CEAST 9350 drop hammer testing device. The dimensions of the testing body were 60×60 mm². In the contact surface there was a circular recess with a diameter of 40 mm for allowing the passing of the hammer, whose mass was 5 kg. The penetration speed was 4.4 m/s. The puncture that took place was measured at 50% (average from several measurements).

Explanations regarding Tab. 1:

$E_t$: Elastic modulus;

Sigma ($\sigma$) x %: Tension in N/mm$^2$ with respect to the corresponding elongation, here in the range from 1% to 25%;

Sigma Y ($\sigma_Y$): Yield stress (yield point);

Epsilon Y ($\varepsilon_Y$): Elongation in % with respect to yield stresses;

Sigma M ($\sigma_M$): Maximum stress (tensile strength) in N/mm$^2$;

Sigma M2 ($\sigma_M 2$): Maximum force in N;

Epsilon M ($\varepsilon_M$): Elongation in % with respect to maximum stress;

Sigma B ($\sigma_B$): Failure stress;

Epsilon B ($\varepsilon_B$): Failure elongation in % with respect to failure stress.

Tab. 1 lists the measurement results of the tensile tests. For easier orientation, the disadvantageous values are printed in italics in the lines for V1 and V2. Especially disadvantageous values are in bold italics. The particularly advantageous values in the lines for B1 and B2 are printed in bold.

It can readily be seen in Tab. 1 that the conventional, commercially available sliding films based on HDPE (comparative examples V1 and V2) bring a significant elongation with them already under slight tensile stress sigma ($\sigma$)-compared with the films B1 and B2 according to the invention. A 1% stretching in md (machine direction) is already reached for V1 with a tensile stress of 15.6 N/mm$^2$ (in each case, the first value in the cells). For V2, an even lower tensile stress of 10.1 N/mm$^2$ is needed.

On the other hand, we see in examples B1 and B2 under a 1% stretching in machine direction (md) that a considerably higher tensile stress (2 to 3 times) is needed (22.6 N/mm$^2$ or 27.0 N/mm$^2$) compared to the comparable films V1 and V2. Even for the tensile stress under a 2.5% stretching, the results for B1 and B2 are significantly more advantageous than for V1 and V2.

Additionally, the very large stretching for V1 occurs more so in the machine direction (md), which is especially disadvantageous. In addition, stretching at the yield point (yielding elongation) in the machine direction (md) lies at 32.2% for V1 and for V2 at 11.0%. The elongation at failure in the machine direction (md) lies at 62.6% for V1 and at 84.1% for V2. It is noticeable that the commercially available film V1 is additionally strongly anisotropic, i.e. the values for machine direction (md) and cross direction (cd) (i.e. transversal to machine direction md) are substantially different in the tensile test.

On the other hand, elongation at failure in example B1 lies merely at 3.5% and in example B2 merely at 3.6% in md. Stretching at the yield point (yielding elongation) lies in B1 only at 3.5% in md. Elongation at failure in the machine direction (md) lies for B1 merely at 3.5% and for B2 merely at 3.6%. The two films B1 and B2 are additionally very little anisotropic in the machine direction (md) and cross direction (cd).

The films B1 and B2 according to the invention thus need, on the one hand, considerably more tensile stress for a stretch (of 1% and 2.5%) and therefore higher tensile strength than the comparative examples V1 and V2, something that is very advantageous for the use as a sliding film for insertion tubes (tube liners) in trenchless sewer pipe renovation. As a result of this, the slide film remains unchanged in its place in the case of B1 and B2 and does not stretch when the insertion tube is pulled through the sewer pipe. The "accordion effect" is therefore almost fully or completely prevented when the insertion tube is no longer being pulled, so that the system can no longer be pulled back as soon as the tensile strength ceases. The sliding films according to the invention therefore serve for ideally "guiding" the insertion tube in the sewer pipe to be renovated.

The tensile test thus shows that the films B1 and B2 according to the invention hardly stretch—neither in cross direction (cd) nor in the important machine direction (md). Stretching at the yield point epsilon Y ($\varepsilon_Y$; yielding elongation) for B1 is only approx. 1/10 of the stretching determined for film V1. The same applies to B1 and B2 for maximum stretching epsilon M ($\varepsilon_M$). The elongation at failure epsilon B ($\varepsilon\varepsilon_B$) is for the films B1 and B2 according to the invention lower by about a factor of 20 compared to V1 and by about a factor of 24 compared to V2. Consequently, the shape and dimension of the films B1 and B2 according to the invention remain almost unchanged when the insertion tube that slides on the sliding film is pulled through the sewer pipe. The films resist large forces acting on them and are sturdy. Thus, they are ideal for use as a sliding film or preliner.

Tab. 2 lists the measurement results of the additional tear resistance tests. Once again, for easier orientation, the disadvantageous values are printed in italics in the lines for V1 and V2. The especially disadvantageous values are given in bold italics, whereas the particularly advantageous values for B1 and B2 are printed in bold in the lines for B1 and B2.

The test and the comparison of additional tear resistance (ATR) of examples B1 and B2 and the comparative examples V1 and V2 produced the following result: As had already been the case with the tensile test, the films B1 and B2 according to the invention need a considerably higher exertion of force for making the film stretch at all or tear. This aspect for use as a sliding film or preliner is especially important precisely in the machine direction (md) because the insertion tube is usually pulled through the pipe in the machine direction (md) of the sliding foil or preliner.

As could already be recognized during the tensile test, film V1 is clearly weak in the machine direction (md), a clear indication of this film's anisotropy. In the machine direction (md), the tear force is only 56 N and the tear resistance only 2.2 N/mm$^2$. Somewhat better values were found with commercially available film V2 (171 N and 5.7 N/mm$^2$).

Contrary to the above, the films B1 and B2 according to the invention with the mixtures of A-PET and LDPE in coating B have a significantly higher (248 and 197 N) and tear resistance (9.8 and 9.9 N/mm$^2$) in the machine direction (md) compared to V1 and V2. The tear resistance of films B1 and B2 is higher by a factor of 4 to 5 compared to V1 in the machine direction (md) and about twice as high compared to V2. Thus, the films according to the invention are ideally suitable for use as a sliding film or preliner for introducing tube liners during trenchless sewer pipe renovation.

Tab. 3 lists the measurement results of the puncture resistance tests. Once again, for easier orientation, the disadvantageous values are in italics in the lines for V1 and V2, whereas the particularly advantageous values are printed in bold in the lines for B1 and B2.

The commercially available film V1 has a maximum puncture force $F_{max}$ of 419.9 N and a penetrating force $F_p$ of 209.2 N. These values are rather low for use as a sliding film for sewer pipe renovation because the sliding film during the sewer pipe renovation protects the insertion tube to be introduced during sewer renovation from possible edges and corners present along the sewer pipe walls. In the case of the comparative film V1, the sliding film could only offer little protection, as it can be punctured with relatively little exertion of force. Higher values are obtained both in comparative example V2 (where the thickness is 600 μm) and in example B2 (where the thickness is 500 μm). These films are considerably more suitable for use as a sliding film than the film from V1.

Tab. 3 shows especially clearly the favorable influence of a higher quantity of polyethylene on the polyester-based film in example B1. While the film from example B2 contains 2% by weight of PE apart from 98% by weight of A-PET in the middle layer B and a maximum puncturing force of 520.54 N is reached, the addition of 20% by weight of polyethylene apart from 78% by weight of A-PET in middle layer B leads to a clear increase of the puncturing force to 601.22 N. This makes the film from B1 according to the invention not only especially puncture-resistant but sturdy as well (see Tab. 1 & 2).

What is claimed:

1. A multilayered film material formable into lightweight packaging, the material comprising:
    a first external layer, wherein a majority of the first external layer comprises polyester;
    a second external layer coextensive with the first external layer and disposed spaced apart from the first external layer, wherein a majority of the second external layer comprises polyester; and
    an inner layer disposed between the first external layer and the second external layer and coextensive with the first external layer and the second external layer;
    wherein the inner layer comprises at least one polyester and at least one modified or unmodified thermoplastic olefin homo- or co-polymer; and
    wherein the thermoplastic olefin homo- or copolymer selected from a group consisting of: (1) polyethylene, (2) polypropylene, (3) polybutylene, (4) polyisobutylene, and (5) a mixture of at least two of the polymers (1) through (4).

2. A multilayered film material formable into lightweight packaging, the material comprising:
    a first external layer;
    a second external layer coextensive with the first external layer and disposed spaced apart from the first external layer; and
    an inner layer disposed between the first external layer and the second external layer and coextensive with the first external layer and the second external layer;
    wherein the inner layer comprises at least one polyester and at least one modified or unmodified thermoplastic olefin homo- or co-polymer;
    wherein the thermoplastic olefin homo- or copolymer is selected from a group consisting of: (1) polyethylene, (2) polypropylene, (3) polybutylene, (4) polyisobutylene, and (5) a mixture of at least two of the polymers (1) through (4); and
    wherein the inner layer comprises more than 50% by weight of polyester and between 10% and 35% inclusive by weight of thermoplastic olefin homo- or copolymer.

3. The multilayered film material of claim 1, wherein the inner layer contains more than 50% by weight of polyester and between 10% and 35% by weight of thermoplastic olefin homo- or copolymer.

4. The multilayered film material of claim 2, wherein a majority of the first external layer and the second external layer comprises polyester, respectively.

5. The multilayered film material of claim 1, wherein the polyester in the inner layer is amorphous polyethylene terephthalate (A-PET).

6. The multilayered film material of claim 5, wherein the A-PET in the inner layer is present with more than 25% by weight, or more than 40% by weight, or more than 50% by weight, or more than 65% by weight.

7. The multilayered film material of claim 2, wherein the polyester in the inner layer is amorphous polyethylene terephthalate (A-PET).

8. The multilayered film material of claim 7, wherein the A-PET in the inner layer is present with more than 25% by weight, or more than 40% by weight, or more than 50% by weight, or more than 65% by weight.

9. The multilayered film material of claim 1, wherein the polyester in the two external layers is amorphous polyethylene terephthalate (A-PET).

10. The multilayered film material of claim 2, wherein the polyester in the two external layers is amorphous polyethylene terephthalate (A-PET).

11. The multilayered film material of claim 1, further comprising an additional layer in the form of an independent barrier layer against the penetration of gases or chemical substances, the barrier layer comprising one or a combination of ethylene vinyl alcohol (EVOH) or polyamide (PA).

12. The multilayered film material of claim 11, wherein the barrier layer further comprises a chemical compound acting as barrier against UV light and visible light, so that a transmission of radiation in the wavelength range from 350 to 450 nm is prevented.

13. The multilayered film material of claim 2, further comprising an additional layer in the form of an independent barrier layer against the penetration of gases or chemical substances; the barrier layer comprising one or a combination of ethylene vinyl alcohol (EVOH) or polyamide (PA).

14. The multilayered film material of claim 13, wherein the barrier layer further comprises a chemical compound acting as barrier against UV light and visible light, so that a transmission of radiation in the wavelength range from 350 to 450 nm is prevented.

15. The multilayered film material of claim 1, wherein the inner layer comprises any one or a combination of: polystyrene (PS); polyhalogenides such as PVC and/or polyvinylidene chloride (PVdC); polyamide (PA); ethylene vinyl alcohol copolymer (EVOH), polyvinyl alcohol (PVOH or PVAL), adhesion promoters, ethylene Vinylacetate (EVAc); one or several ionomers; one or several poly(meth)acrylates; poly(meth)acrylates containing ethylene, polyvinyl acetate (PVAc); polycarbonate (PC); poly-acrylnitrile (PAN); other polyesters such as polybutylene terephthalate (PBT), polyethylene naphthalate (PEN), polylactic acid (PLA) and/or polyhydroxy-alkanoates (PHA); one or several ethylene acrylic acid copolymers (EAA); polyvinyl butyral (PVB); polyvinyl acetal; cellulose acetate (CA); cellulose acetobutyrate (CAB); polysaccharides; starch.

16. The multilayered film material of claim 2, wherein the inner layer comprises any one or a combination of: polystyrene (PS); polyhalogenides such as PVC and/or polyvinylidene chloride (PVdC); polyimide (PA); ethylene vinyl alcohol copolymer (EVOH), polyvinyl alcohol (PVOH or PVAL), adhesion promoters, ethylene Vinylacetate (EVAc); one or several ionomers; one or several poly(meth)acrylates; poly(meth)acrylates containing ethylene, polyvinyl acetate (PVAc); polycarbonate (PC); poly-acrylnitrile (PAN); other polyesters such as polybutylene terephthalate (PBT), polyethylene naphthalate (PEN), polylactic acid (PLA) and/or polyhydroxy-alkanoates (PHA); one or several ethylene acrylic acid copolymers (EAA); polyvinyl butyral (PVB); polyvinyl acetal: cellulose acetate (CA); cellulose acetobutyrate (CAB); polysaccharides; starch.

17. The multilayered film material of claim 1, wherein the multilayered film is formed in an extrusion process, wherein any one or a combination of the following are added to the inner layer or additional layers for the extrusion process: adhesive promoters, functionalized polymers such as EVOH, optical brighteners, thermal stabilizers, slip agents, antioxidants, oxygen scavengers, spacers (e.g. silica particles, SAS), slip/antiblocking agents, colors, pigments, foaming agents, antistatic agents, process aids, lubricating agents, flame retardants, flame inhibitors, impact modifiers, impact resistance improvers, anti-hydrolysis agents, UV absorbers, UV protection agents, stabilizers, antifogging additives, waxes, wax additives, release agents, sealing or peeling additives, nucleating agents, compatibilizers, flow agents, flow improvers, melt strength enhancers, molecular weight increasers, cross-linkers or softeners.

18. The multilayered film material of claim 2, wherein the multilayered film is formed in an extrusion process, wherein any one or a combination of the following are added to the inner layer or additional layers for the extrusion process: adhesive promoters, functionalized polymers such as EVOH, optical brighteners, thermal stabilizers, slip agents, antioxidants, oxygen scavengers, spacers (e.g. silica particles, SAS), slip/antiblocking agents, colors, pigments, foaming agents, antistatic agents, process aids, lubricating agents, flame retardants, flame inhibitors, impact modifiers, impact resistance improvers, anti-hydrolysis agents, UV absorbers, UV protection agents, stabilizers, antifogging additives, waxes, wax additives, release agents, sealing or peeling additives, nucleating agents, compatibilizers, flow agents, flow improvers, melt strength enhancers, molecular weight increasers, cross-linkers or softeners.

19. The multilayered film material of claim 1, wherein the inner layer is a foamed layer.

20. The multilayered film material of claim 2, wherein the inner layer is a foamed layer.

* * * * *